(12) United States Patent
Bradley et al.

(10) Patent No.: US 8,808,043 B2
(45) Date of Patent: Aug. 19, 2014

(54) SYSTEM FOR MOUNTING AN OBJECT ON A FLEXIBLE OR CURVED SURFACE

(75) Inventors: Todd Bradley, Honolulu, HI (US); Brett Ritter, Santa Barbara, CA (US)

(73) Assignee: Wenonah Canoe, Inc., Winona, MN (US)

( * ) Notice: Subject to any disclaimer, the term of this patent is extended or adjusted under 35 U.S.C. 154(b) by 389 days.

(21) Appl. No.: 13/235,853

(22) Filed: Sep. 19, 2011

(65) Prior Publication Data

US 2013/0071178 A1  Mar. 21, 2013

(51) Int. Cl.
*F16B 11/00* (2006.01)

(52) U.S. Cl.
USPC .................................. 440/79; 441/66; 441/74

(58) Field of Classification Search
USPC .......... 440/104–106; 441/74, 79, 66; 114/345
See application file for complete search history.

(56) References Cited

U.S. PATENT DOCUMENTS

| | | | | |
|---|---|---|---|---|
| 1,765,002 A | * | 6/1930 | Boyle et al. | 440/109 |
| 4,656,960 A | * | 4/1987 | Davenport | 114/144 R |
| 4,762,078 A | * | 8/1988 | Palmer, Jr. | 114/61.25 |

* cited by examiner

*Primary Examiner* — Edwin Swinehart
(74) *Attorney, Agent, or Firm* — Leighton K. Chong (57) ABSTRACT

An outer mounting body is made of semi-soft material having a primarily flat planar shape formed with an upper housing portion, and an outer flange portion having a planar upper surface tapering from the housing portion to outer peripheral edges of the mounting body and adapted to be mounted to flexible or curved surfaces such as those of an inflatable surfboard. An inner mounting insert made of rigid material is molded within the outer mounting body and has an upper recess for sturdily mounting an object such as a surfboard fin. The inner mounting insert may be formed asymmetric for reversibly mounting left and right side fins near the edges of a surfboard.

10 Claims, 7 Drawing Sheets

SYSTEM FOR MOUNTING AN OBJECT ON A FLEXIBLE OR CURVED SURFACE

TECHNICAL FIELD

This invention generally relates to a mounting system for an object on a surface, and more particularly, to mounting an object that will be subject to high forces in use sturdily on a flexible or curved surface.

BACKGROUND OF INVENTION

Mounting an object on a surface, particularly an object that will be subject to high forces in use, such as a fin on the underside surface of a surfboard, requires balancing the need for sturdiness of the object with the physical limitations of the mounting surface. It is commonly known and practiced to have removable, interchangeable, high performance surf board fin systems used in the manufacture of traditional hard or rigid construction surfboards, boogie boards, paddle boards, race boards, hand boards and stand up paddle boards. Prior mounting systems for surfboard fins are known in which a rigid mounting receptacle (often referred to as a "fin box" or "fin mounting box") is received in a matching recess sunken into the surface of the surfboard where a fin is to be mounted. A fin having one or more insert tabs on its lower surface is mounted on the fin box by inserting the tabs into slots formed in an upper surface of the fin box and securely fastening them therein, such as with set screws tightened into inclined screw holes communicating into the slots from the sides of the fin.

In recent years, the newly developed sport of paddleboarding has required boards longer than the typical surfboard to be used, for example, 9 to 12 feet long, in order to support the weight of a standing paddler on the board floating in water. Such extended length paddleboards are consequently heavier and more awkward for person to carry, and are often longer than the beds of sport trucks or roof-racks of sport utility vehicles. As a result, inflatable paddleboards have been developed with flexible outer skins on a honeycomb or fibrous inner structure that can be inflated under pressure to form turgid and firm outer surfaces for paddleboarding use, yet allow them to be deflated and even folded for transport or storage. However, rigid fin boxes are difficult to mount sturdily to the flexible outer skins of such inflatable paddleboards and/or have points or edges that can wear upon or penetrate the flexible outer skins when they are handled in a deflated condition. The rigid boxes are also difficult to use for mounting outer fins of a fin cluster near the edges of an inflatable board due to the curvature of the board surfaces and lesser amount of inner volume at its edges.

A new class of board construction has been developed for inflatable board equipment. The current state of the art for fins or fin clusters on inflatable boards is to make them out of semi-soft, rubber-like materials that are permanently glued onto the boards. These soft fins are very low in strength, rigidity, and quality, which are demanded for performance and functionality by users. The fins deform over time while also degrading when exposed to rough, hard surfaces like rocks or coral and cannot be readily removed and replaced to maintain a desired level of performance. The physical properties of a soft fin are also limited by the nature of the semi-soft material it is made of.

It has also become a growing trend to provide multifunctional utility and water safety equipment for a wide range of water environments, such as rescue boards and sleds, flotation mats, dinghies, towed watercraft, etc. As such equipment becomes more ubiquitous and deployable from many different platforms, often with little stowage space, the demand for inflatable equipment that can be deflated and folded for storage has increased. Mounting objects subject to high forces in use, such as handholds, tow lugs, oarlocks, rope rings, stanchions, etc., on outer surfaces of such inflatable equipment requires a mounting system that can accommodate flexible, curved and/or foldable outer surfaces, without sacrificing sturdiness, strength, resistance to wear, and long service life.

SUMMARY OF INVENTION

In accordance with the present invention, a system for mounting an object sturdily on a flexible or curved surface:

an outer mounting body made of semi-soft or pliable material having a primarily flat planar shape formed with an upper housing portion raised from a base elevation to a raised housing elevation of said mounting body, and with an outer flange portion having a planar upper surface tapering from the base elevation of the housing portion to outer peripheral edges of said mounting body, said mounting body further having a planar undersurface made of the semi-soft or pliable material adapted to be mounted with an adhesive to a flexible or curved surface, and an inner mounting insert made of rigid or non-pliable material that is molded into the semi-soft or pliable material within a volume of the housing portion defined from its base to raised housing elevation so as to be held immobile by said outer mounting body, said inner mounting insert having an upper surface provided with a recess for receiving and securely fastening therein a rigid or non-pliable insert member of an object to be sturdily mounted on the flexible or curved surface.

In a preferred embodiment of the invention, adapted for removably mounting a rigid fin on an undersurface of an inflatable surfboard, the mounting body is formed in a flat elliptical shape with its raised housing portion extending longitudinally along a major axis of the elliptical shape. The inner mounting insert has a pair of tab slots formed in its upper surface arranged in-line longitudinally along the major axis for receiving corresponding in-line tabs members of a fin made of rigid or non-pliable material and securely fastening them therein.

In an especially preferred embodiment of the fin mounting system, the inner mounting insert has sideways extending support members formed asymmetrically on only one side of the major axis of the elliptical mounting body, thereby enabling the fin mounting system to be used for mounting an outer fin of a fin cluster to the flexible outer skin of an inflatable board. The other transverse side of the mounting body that does not have rigid or non-pliable support members molded therein can be more readily mounted in proximity to a curved part or edge of the inflatable board's surface. The outer flange portion of the mounting body is provided with a number of acute-angle cuts formed on its periphery as stress-relief zones to accommodate surface curvature or flexing of the surface to which the mounting body is glued.

The fin (or other object) mounting system of the present invention can be used for inflatable watercraft of all types. The system is designed to securely mount a rigid object, such as a hard-shell performance fin, on any inflatable watercraft by means of the uniquely designed rigid mounting insert which is molded into a pliable mounting body that can be glued to a flexible or curved surface of the inflatable watercraft. The 2-part system can accommodate current high-performance removable fins, while also being adaptable for mounting a variety of objects sturdily to inflatable or hard-shell types of watercraft.

Other objects, features, and advantages of the present invention will be explained in the following detailed description of the invention having reference to the appended drawings.

BRIEF DESCRIPTION OF DRAWINGS

FIG. 5A is a plan view, FIG. 5B is a front sectional view, FIG. 5C is a side sectional view.

FIG. 6A is a plan view, FIG. 6B is a front sectional view, FIG. 6C is a side sectional view.

FIG. 7A is a plan view, FIG. 7B is a front sectional view, FIG. 7C is a side sectional view.

DETAILED DESCRIPTION OF INVENTION

In the following description, a system for mounting an object sturdily on a flexible or curved surface of sports utility equipment is described. As illustrative examples, certain preferred embodiments for mounting a fin or fins on an inflatable board are described. However, it is to be understood that the described principles of the invention may be adapted to mounting a wide range of other objects on other types of equipment and for other environments of usage.

Figure 1:
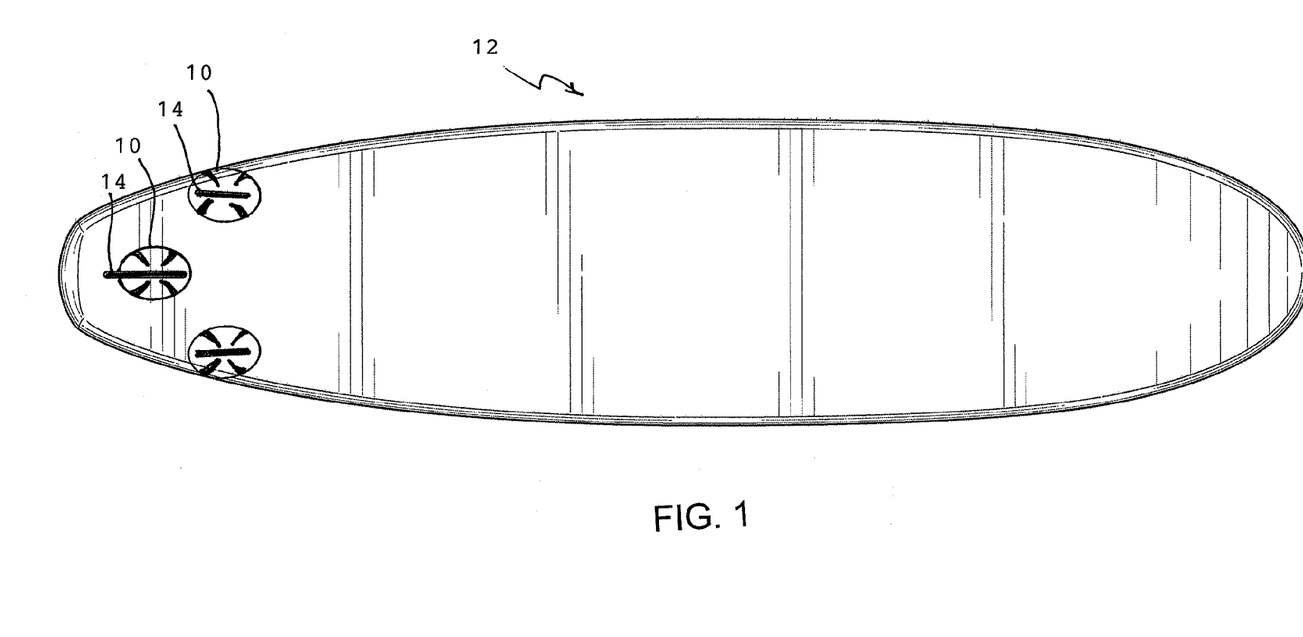
FIG. 1 illustrates a system for mounting an object sturdily on a flexible or curved surface in accordance with the present invention, particularly as adapted for mounting fins on a surfboard.

In FIG. 1, a system for mounting an object sturdily on a flexible or curved surface in accordance with the present invention is shown particularly as adapted for mounting fins on a surfboard. The system employs a mounting body 10 which is glued or otherwise adhered to the surface of the surfboard 12 where one or more fins 14 are to be mounted.

Figures 2, 3:
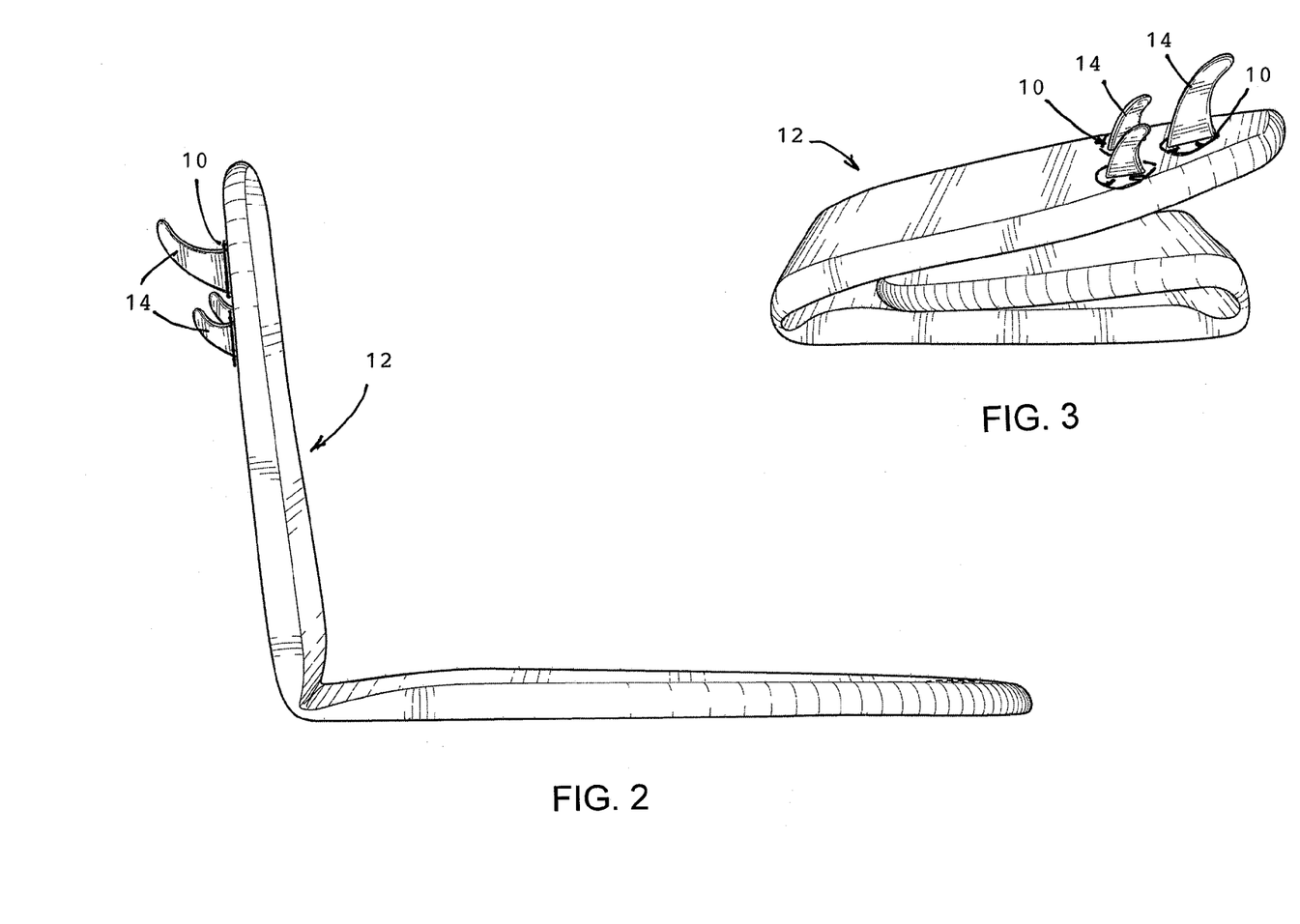
FIGS. 2 and 3 illustrate the fin mounting system as used on an inflatable surfboard that can be deflated and folded for storage or transport.

FIGS. 2 and 3 illustrate the fin mounting system as used on an inflatable surfboard which has a flexible outer skin on a honeycomb or fibrous inner structure that can be inflated under pressure to form turgid and firm outer surfaces for use, yet allow them to be deflated and even folded for transport or storage.

Figure 4A:
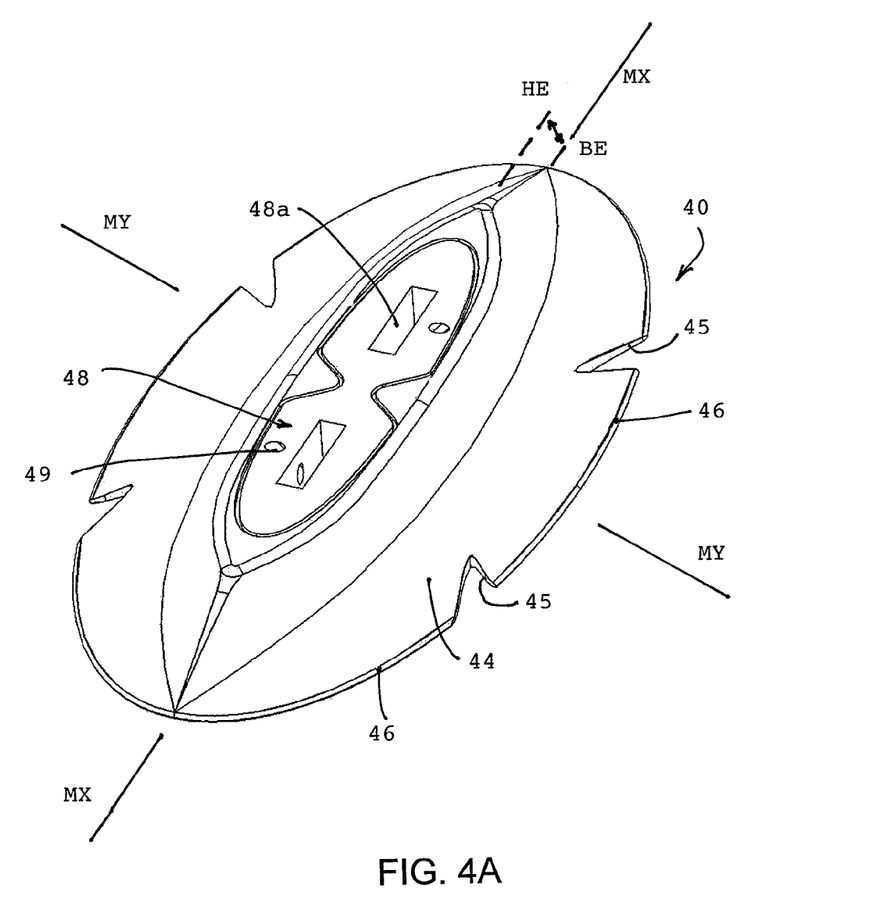
FIG. 4A shows a top perspective view and FIG. 4B shows a bottom perspective view of a preferred embodiment of the fin mounting system.

In FIG. 4A, a preferred embodiment of the fin mounting system is shown having an outer mounting body 40 made of semi-soft or pliable material having a primarily flat planar shape formed with an upper housing portion 42 raised from a base elevation BE to a raised housing elevation HE of the mounting body. The mounting body has an outer flange portion 44 having a planar upper surface tapering from the base elevation of the housing portion to the peripheral edges 46 of the mounting body. An inner mounting insert 48 made of rigid or non-pliable material is molded into the semi-soft or pliable material of the housing portion 42 within the volume from its base elevation BE to its raised housing elevation HE of the mounting body, and is thereby sturdily held immobile in the mounting body. The inner mounting insert has an upper surface provided with one or more recesses or tab slots 48a for receiving and securely fastening therein a rigid or non-pliable insert member of an object such as a fin to be sturdily mounted therein. The insert members are securely fastened in the tab slots 48a by set screws threaded into side screw holes 49 communicating into the tab slots. Other types of fin mounting systems that attach a fin component to a base fixed in the board may of course be used, such as, for example, a fin slot-insert system.

In a particularly preferred embodiment of the fin mounting system, the mounting body 40 is formed primarily in a flat elliptical shape with the raised housing portion 42 and inner mounting insert 48 molded therein extending longitudinally along a major axis MX of the elliptical shape. The inner mounting insert 48 has sideways extending support members (shown in later figures) molded into the housing portion 42 which are formed asymmetrically on only one side of the major axis MX. Since the support members made of rigid or non-pliable material are arranged on only one transverse side of the mounting body 40 made of semi-soft or pliable material, the fin mounting system can be used for mounting an outer fin of a fin cluster with its other transverse side that does not have rigid or non-pliable support members molded therein mounted in proximity to a curved surface near or on an edge of the inflatable board. Since the outer mounting body and inner mounting insert are symmetric with respect to the minor axis MY, they can be reversed in position to mount an outer fin on an opposite side. The outer flange portion 44 of the mounting body has a number of acute-angle cuts 45 formed on its periphery as stress-relief zones to accommodate surface curvature or flexing of the surface to which the mounting body is glued.

Figure 4B:
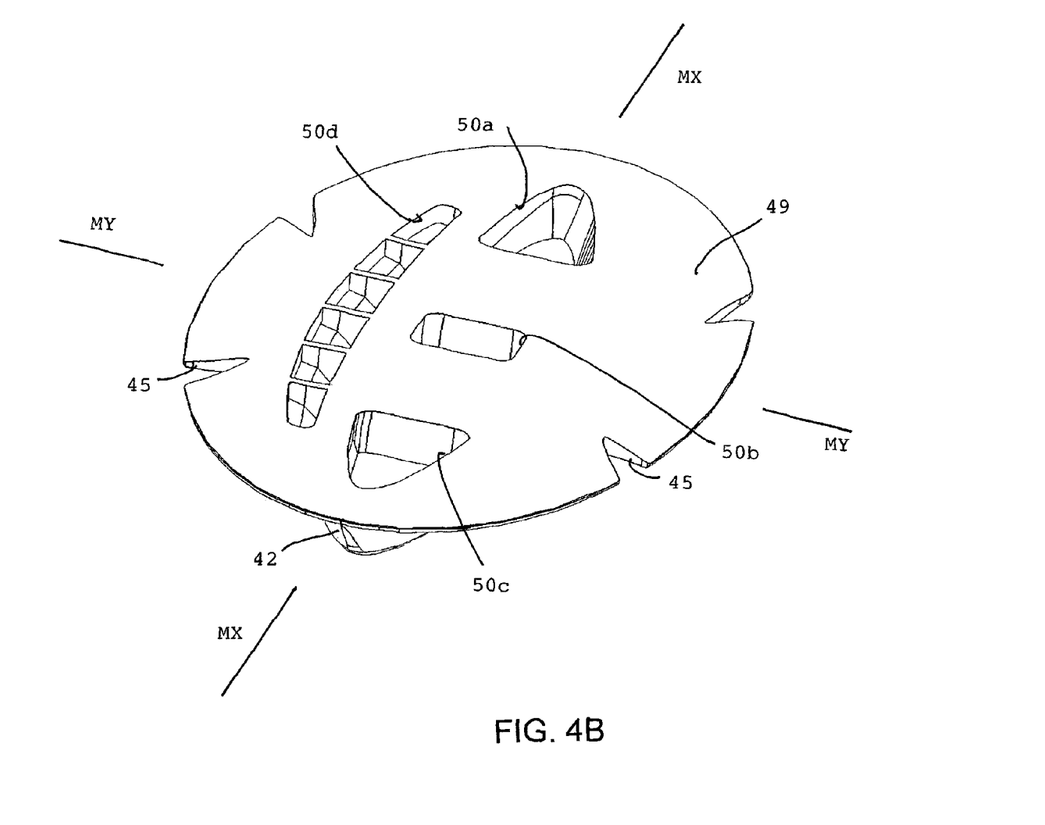

In FIG. 4B, the undersurface 49 of the outer mounting body 40 is also made of semi-soft or pliable material. Through holes 50a, 50b, 50c may be formed through the undersurface for insertion of supports during the molding process, and also act as stress-relief zones to accommodate surface curvature or flexing of the surface to which the mounting body is glued. Cut-out portions 50d may be formed through the undersurface on the transverse side where the sideways support members of the inner mounting insert are absent and also act as stress-relief zones.

Figure 5A:
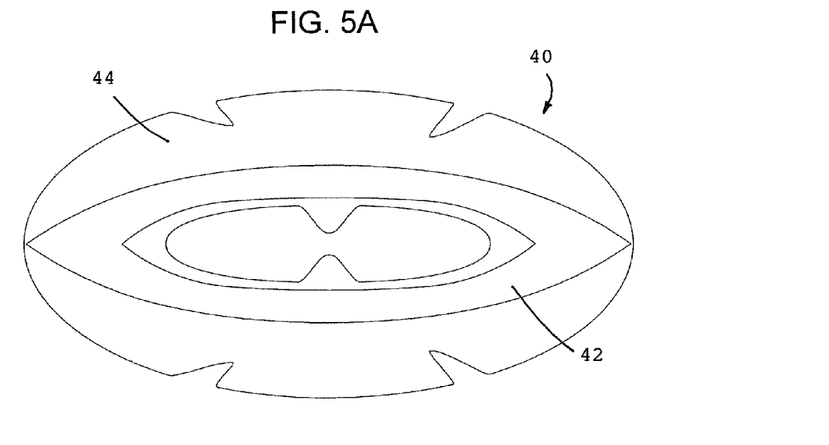
Figure 5B:
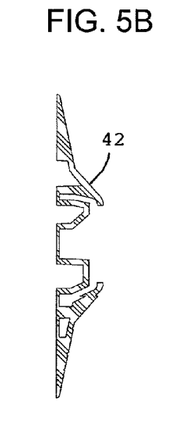
Figure 5C:
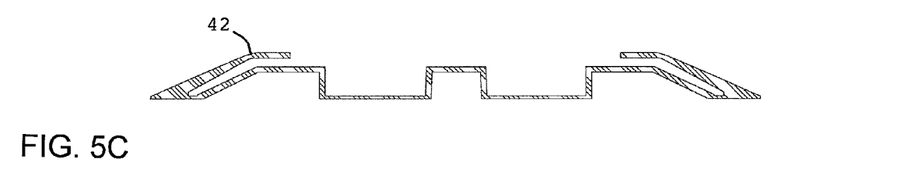
Figure 5D:
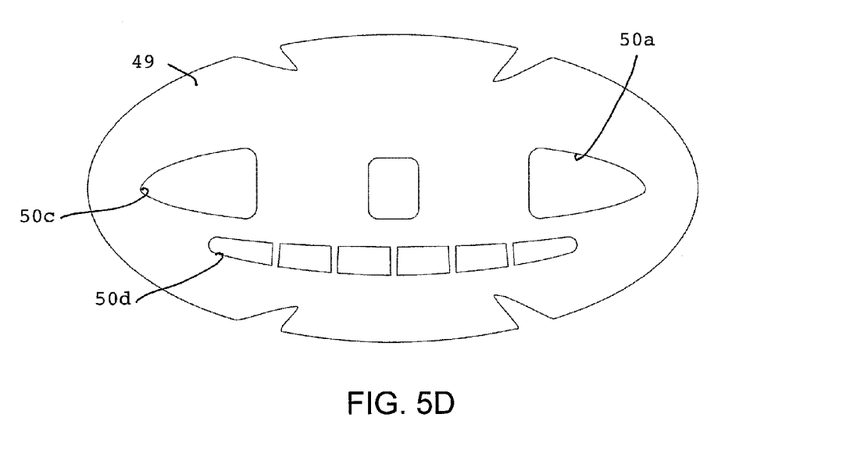
FIG. 5D is a bottom view of an outer mounting body made of semi-soft or pliable material for the fin mounting system.

FIG. 5A is a plan view, FIG. 5B is a front sectional view, FIG. 5C is a side sectional view, and FIG. 5D is a bottom view of the outer mounting body 40 made of semi-soft or pliable material for the fin mounting system.

Figure 6A:
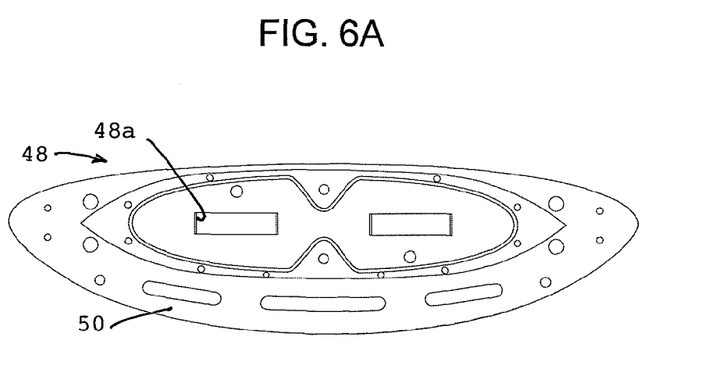
Figure 6B:
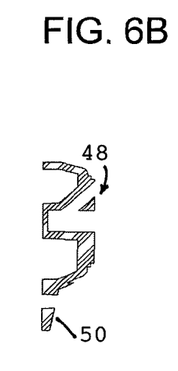
Figure 6C:
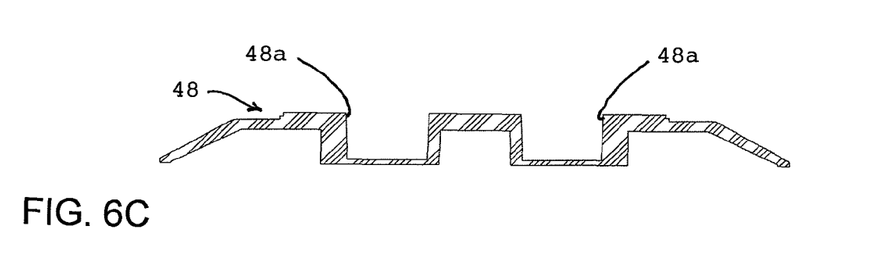
Figure 6D:
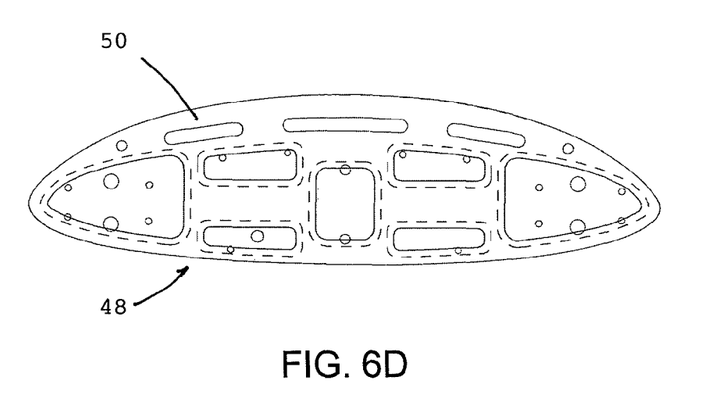
FIG. 6D is a bottom view of an inner mounting insert made of rigid or non-pliable material for the fin mounting system.

FIG. 6A is a plan view, FIG. 6B is a front sectional view, FIG. 6C is a side sectional view, and FIG. 6D is a bottom view of the inner mounting insert made of rigid or non-pliable material for the fin mounting system. The inner mounting insert 48 has sideways extending support members 50 which are formed asymmetrically on only one side of the major axis of the outer mounting body 40. The support members may be formed integrally with the inner mounting insert and shaped like a plate or flange with a number of stress-relief apertures as shown. The placement of the sideways extending support members 50 made of rigid or non-pliable material on one transverse side of the mounting body 40 enables high forces on a mounted object to be distributed over the dimensional extent of the inner mounting insert, and from there to the undersurface 49 of the outer mounting body and the equipment surface to which it is adhered, while leaving the other transverse side free of rigid insert material so that it can be used for mounting in proximity to a curved part or edge of the underlying equipment.

Figure 7A:
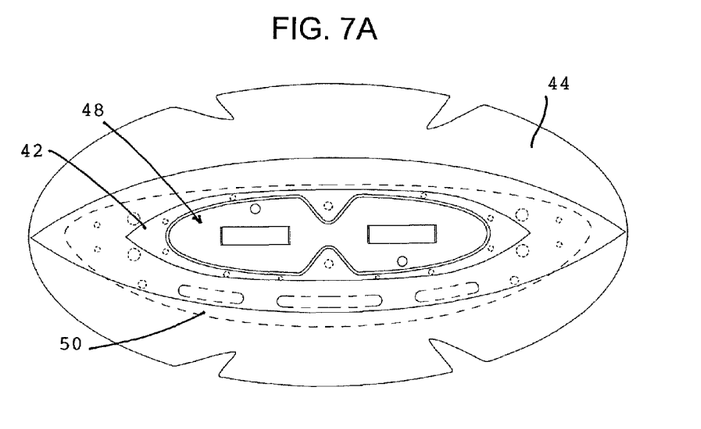
Figure 7B:
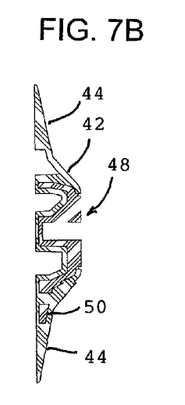
Figure 7C:
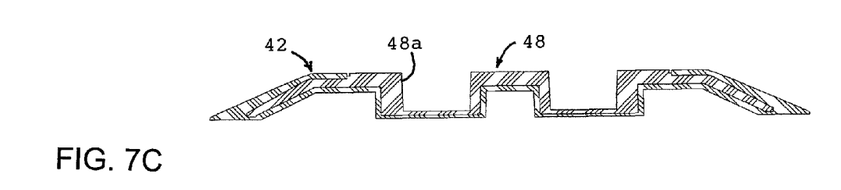
Figure 7D:
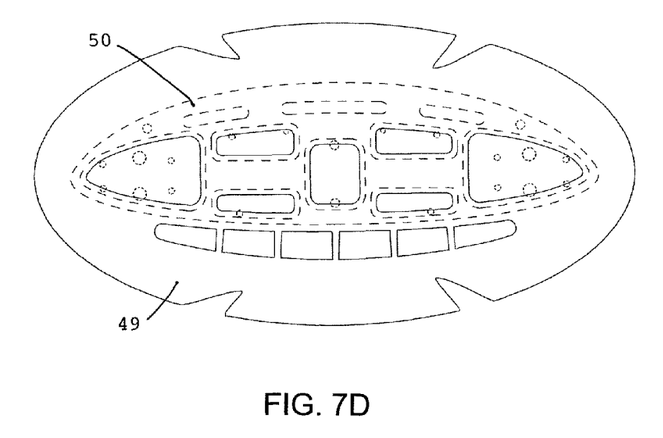
FIG. 7D is a bottom view of the outer mounting body with the inner mounting insert molded therein for the fin mounting system.

FIG. 7A is a plan view, FIG. 7B is a front sectional view, FIG. 7C is a side sectional view, and FIG. 7D is a bottom view of the outer mounting body with the inner mounting insert molded therein for the fin mounting system.

In use, the fin mount can be affixed to the surface of a surfboard, especially on the flexible or curved surface of an inflatable surfboard, with a typical adhesive glue system, Velcro, or any other manner of mechanical attachments such as screws, etc. The 2-part mounting system can be configured to integrate with any number of industry-standard hard fins from various manufacturers via the various standardized mechanical interface systems unique to each fin system.

The injection-molded inner core part of the 2-part mounting system may be made of Nylon-6 (GA PA6) and may have a small percentage of short strand, chopped, glass fill to improve its stiffness and rigidity depending on any particular application. The Nylon-6 material is preferably injection molded to about 85-90 durometer on the Shore A scale. The inner core is then placed into a second injection mold set up to create an overmolding of softer TPU (polyurethane) material that creates the stability base and glue/adherence surface to the substrate. The softer TPU is preferably molded to about 60-65 durometer on the Shore A scale. It is critical to have a dual-density assembly that works to match the densities of the materials that each part interfaces with. The hard Nylon-6 must be as hard (stiff) as or harder (stiffer) than the fins it is meant to interface with and hold securely in place, while the soft and pliable TPU must be of a similar durometer and flexibility as that of the surface material of the inflatable craft it is mounted on, in order to allow it to flex and form with the small movements and deformations of the craft.

The inner core preferably has a number of specialized thru-holes (see FIGS. 6A and 6D) molded into it that allow the overmolded TPU to flow through, over and around the part to capture and encapsulate the inner core to insure its complete integration and secure connection with the TPU overmold and therefore to the craft. These specialized holes are depicted in a number of various shapes from round circles to oval pill shapes—but may even be square or rectangular depending on the required application. No matter what the shape, each hole is preferably molded with a draft angle of approximately 5-8 degrees on the interior walls that serve to allow the overmolded TPU to flow easily and completely through the holes and into the rest of the overmold cavities. The resulting conical shapes of the molded-through capture columns then serve to accentuate the supporting function of the TPU to the Nylon-6 core. They have a wider base that serves to mechanically carry the dynamic loading forces that the fin places on the system under use and circumvent torque, shear, lateral, tear, and other loading forces from pulling the core out from the overmold TPU. This mechanical advantage is critical to the successful installation of the system into use with the craft. Without these capture columns the inner core/outer TPU system may not be able to effectively hold the fin to the board under stress. The capture columns also serve as connection points between the top and bottom surfaces of the TPU overmold in various strategic locations that help to increase the overall strength of the 2-part system by making smaller the amount of unsupported surface or face areas of the TPU overmold.

The inner core may preferably be formed asymmetrical on one short-side of the longitudinal axis of the 2-part system, while being generally symmetric from long-end to long-end. This allows the system to be used reversibly in left and right side locations near the edges or side surfaces on a craft, such as the right and left fins on each side of a central fin of a 3-fin cluster. The axial asymmetry allows the inner core to have as much base supporting surface as possible to help offset dynamic loading forces—while allowing the ability of the overall system to be mounted on or around curved edges, rails or other specialized structural shapes and forms of the craft. The base support surface of the side wing of the inner core also serves to further bolster the integration of the inner core and TPU overmold by offering greater surface area and higher count of specialized through holes that create the required attachment points and capture columns. This wing is molded with a tapered cross section form to allow the overmolded TPU to take the same form and therefore be attached as a system to the craft surface with the least amount of drag or hydro friction build up that creates unwanted turbulence in the flow of water over surfaces and limits the effectiveness of the function of the fins and overall performance of the craft.

The TPU overmold part is preferably formed as a generally symmetric part. This is required to create a number of mechanical advantages for the overall system installation. The larger surface area of the base of the TPU offers a greater bonding surface area of the system to the craft and is further required to create a balanced loading of forces on the dynamic part that prevents the system from being torn off of the craft under use. The opposite wing shape of the TPU overmold that is devoid of the Nylon inner core allows for the system to be wrapped and conformed to various surface shapes of the craft while still offering the extended attachment surface and greater mechanical advantage over loading forces. There are small notch features designed into the perimeter shape of the TPU that allow for further efficient application and conformance of the system to the craft without creating wrinkles, creases, overlaps, or other improper bonding issues in the TPU surface integration. The TPU part also has a tapered cross section in both the lateral and longitudinal directions that allow for best and proper hydro dynamics of the parts system integration to the craft.

The oval shape of the softer TPU overmold of the 2-part system allows the hard support element of the inner core and therefore the fin itself to be positioned as close as possible to the edge or rail of the watercraft with the minimum amount of excess TPU material wrapping onto the side walls or rails of the craft—which is the preferred installation technique for proper hydro dynamic performance of a fin and of a craft overall. The oval shape is refined by pulling the radii of the distal ends in as tight as possible to make them as small as possible with the least amount of width as possible—which allows for the trailing edge of the fins to be placed as close to the rail of craft as possible, which is the preferred method of fin location and orientation.

The semi-soft or pliable material of the outer mounting material may also be made of other moldable material such as natural rubber, silicone rubber, urethane foam. The inner mounting insert may be made of other rigid materials such as high-density, high-strength plastics such as PTFE or PVDE, graphite composites, high-strength metals, ceramics, etc.

In summary, the present invention provides a system for mounting an object that is to be subject to high forces in use sturdily onto a flexible or curved surface, such as on inflatable water sports and safety equipment. The mounting system can be used to mount handholds, tow lugs, oarlocks, rope rings, stanchions, etc., on outer surfaces of such inflatable equipment, without sacrificing sturdiness, strength, resistance to wear, and long service life.

It is to be understood that many modifications and variations may be devised given the above description of the principles of the invention. It is intended that all such modifications and variations be considered as within the spirit and scope of this invention, as defined in the following claims.

The invention claimed is:

1. A system for mounting a rigid fin on an undersurface of an inflatable surfboard comprising:

an outer mounting body made of semi-soft or pliable material formed with an upper housing portion raised from a base elevation to a raised housing elevation of said mounting body, and with an outer flange portion having an upper surface tapering from the base elevation of the housing portion to outer peripheral edges of said mounting body, said mounting body further having a planar undersurface made of the semi-soft or pliable material and adapted to be mounted with an adhesive to a flexible or curved surface, and an inner mounting insert made of rigid or non-pliable material that is molded into the semi-soft or pliable material within a volume of the housing portion defined from its base to raised housing elevation so as to be held immobile by said outer mounting body, said inner mounting insert having an upper surface provided with a recess for receiving and securely fastening therein a rigid or non-pliable insert member of a fin to be sturdily mounted on the flexible or curved surface, wherein said outer mounting body is formed in a flat elliptical shape with the raised housing portion extending longitudinally along a major axis of the elliptical shape, and wherein said inner mounting insert has a pair of tab slots formed in its upper surface arranged in-line longitudinally along the major axis of the elliptically-shaped mounting body for receiving corresponding in-line tabs on the rigid or non-pliable insert member of the fin and securely fastening them therein.

2. A system according to claim 1, wherein the tab slots of said inner mounting insert have side screw holes communicating into the tab slots into which set screws can be threaded into the tab slots to securely fasten the corresponding in-line tabs on the rigid or non-pliable insert member of the fin therein.

3. A system according to claim 1, wherein said outer mounting body and said inner mounting insert are adapted and configured for mounting the fin on equipment of the group consisting of: surfboards; rescue boards; rescue sleds; flotation mats; dinghies; and watercraft.

4. A system according to claim 1, wherein said outer mounting body is preferably made of polyurethane material.

5. A system according to claim 1, wherein said inner mounting insert is preferably made of Nylon-6 material with a small amount of short strand, chopped, glass fill to improve stiffness and rigidity.

6. A system according to claim 1, wherein said inner mounting insert is preferably injection molded to about 85-90 durometer on the Shore A scale, and overmolded with the outer mounting body preferably molded to about 60-65 durometer on the Shore A scale.

7. A system for mounting a rigid fin on an undersurface of an inflatable surfboard comprising:

an outer mounting body made of semi-soft or pliable material formed with an upper housing portion raised from a base elevation to a raised housing elevation of said mounting body, and with an outer flange portion having an upper surface tapering from the base elevation of the housing portion to outer peripheral edges of said mounting body, said mounting body further having a planar undersurface made of the semi-soft or pliable material and adapted to be mounted with an adhesive to a flexible or curved surface, and an inner mounting insert made of rigid or non-pliable material that is molded into the semi-soft or pliable material within a volume of the housing portion defined from its base to raised housing elevation so as to be held immobile by said outer mounting body, said inner mounting insert having an upper surface provided with a recess for receiving and securely fastening therein a rigid or non-pliable insert member of a fin to be sturdily mounted on the flexible or curved surface, wherein said outer mounting body is formed in a flat elliptical shape with the raised housing portion extending longitudinally along a major axis of the elliptical shape, and wherein said inner mounting insert has sideways extending support members formed asymmetrically on only one side of the elliptical major axis, for enabling its other transverse side that does not have rigid or non-pliable support members molded therein to be mounted readily in proximity to a curved part or edge of the inflatable surfboard.

8. A system according to claim 7, wherein said inner mounting insert is formed with thru-holes that allow the semi-soft or pliable material of said outer mounting body to be overmolded and flow through to capture and encapsulate said inner mounting insert.

9. A system according to claim 7, wherein said outer mounting body and asymmetric inner mounting insert are used for mounting the fin of a 3-fin cluster in a location near an edge of a surfboard.

10. A system for mounting a rigid fin on an undersurface of an inflatable surfboard comprising:

an outer mounting body made of semi-soft or pliable material formed with an upper housing portion raised from a base elevation to a raised housing elevation of said mounting body, and with an outer flange portion having an upper surface tapering from the base elevation of the housing portion to outer peripheral edges of said mounting body, said mounting body further having a planar undersurface made of the semi-soft or pliable material and adapted to be mounted with an adhesive to a flexible or curved surface, and an inner mounting insert made of rigid or non-pliable material that is molded into the semi-soft or pliable material within a volume of the housing portion defined from its base to raised housing elevation so as to be held immobile by said outer mounting body, said inner mounting insert having an upper surface provided with a recess for receiving and securely fastening therein a rigid or non-pliable insert member of a fin to be sturdily mounted on the flexible or curved surface, wherein said outer mounting body is formed in a flat elliptical shape with the raised housing portion extending longitudinally along a major axis of the elliptical shape, and wherein the outer flange portion of said mounting body has a number of acute-angle cuts formed on the outer peripheral edges to act as stress-relief zones to accommodate surface curvature or flexing of the surface to which the mounting body is mounted.

* * * * *